US008583897B2

(12) United States Patent
Craske

(10) Patent No.: US 8,583,897 B2
(45) Date of Patent: Nov. 12, 2013

(54) REGISTER FILE WITH CIRCUITRY FOR SETTING REGISTER ENTRIES TO A PREDETERMINED VALUE

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 640 days.

(21) Appl. No.: 12/320,710

(22) Filed: Feb. 2, 2009

(65) Prior Publication Data

US 2010/0199072 A1    Aug. 5, 2010

(51) Int. Cl.
*G06F 9/30* (2006.01)

(52) U.S. Cl.
USPC .......................................................... 712/208

(58) Field of Classification Search
None
See application file for complete search history.

(56) References Cited

U.S. PATENT DOCUMENTS

| | | | | |
|---|---|---|---|---|
| 5,564,056 | A * | 10/1996 | Fetterman et al. | 712/23 |
| 5,634,046 | A * | 5/1997 | Chatterjee et al. | 712/227 |
| 5,799,163 | A * | 8/1998 | Park et al. | 712/205 |
| 5,870,581 | A * | 2/1999 | Redford | 712/218 |
| 5,903,740 | A * | 5/1999 | Walker et al. | 712/217 |
| 6,014,517 | A * | 1/2000 | Shagam et al. | 717/142 |
| 6,189,089 | B1 * | 2/2001 | Walker et al. | 712/218 |
| 6,512,706 | B1 * | 1/2003 | Arnold et al. | 365/189.12 |
| 6,718,429 | B1 * | 4/2004 | Theis | 711/101 |
| 7,340,591 | B1 * | 3/2008 | Pechanek et al. | 712/217 |
| 7,631,207 | B1 * | 12/2009 | Song et al. | 713/320 |
| 2001/0011342 | A1 * | 8/2001 | Pechanek et al. | 712/16 |
| 2004/0060015 | A1 * | 3/2004 | Mochizuki | 716/1 |
| 2004/0128480 | A1 * | 7/2004 | Anati et al. | 712/214 |
| 2004/0193846 | A1 * | 9/2004 | Sprangle | 712/218 |
| 2005/0055543 | A1 * | 3/2005 | Moyer | 712/225 |
| 2005/0278510 | A1 * | 12/2005 | Jacobs et al. | 712/218 |
| 2006/0101258 | A1 * | 5/2006 | Jones et al. | 712/300 |
| 2009/0132793 | A1 * | 5/2009 | Venkumahanti et al. | 712/225 |

OTHER PUBLICATIONS

ARM (ARM and Thumb-2 Instruction Set Quick Reference Card)—Document No. ARM QRC 0001L; ARM Limited; Mar. 2007; 6 pages.*
MIPS (MIPS32™ Architecture for Programmers—vol. I: Introduction to the MIPS32™ Architecture); Document No. MD00082; Revision 0.95; Mar. 12, 2001; 77 pages.*

* cited by examiner

*Primary Examiner* — Keith Vicary
(74) *Attorney, Agent, or Firm* — Nixon & Vanderhye P.C.

(57) ABSTRACT

A register file comprising a plurality of register entries for storing data values for use in the execution of data processing instructions is provided, and comprises at least one write port and at least one read port, and circuitry responsive to a write request received at said at least one write port to update one of said plurality of register entries identified by an address specified by said write request with a data value specified by said write request. The register file also comprises further circuitry responsive to a received control signal to set at least a portion of a predetermined register entry to a predetermined value. In this way, certain register file updating instructions can be executed in parallel with other instructions without the need for additional full write-ports as would be required for typical dual-issue, thereby reducing area and routing complexity and cost compared with the use of an additional write-port due to the lower gate count required by the proposed further circuitry.

26 Claims, 5 Drawing Sheets

1

Figure 1:
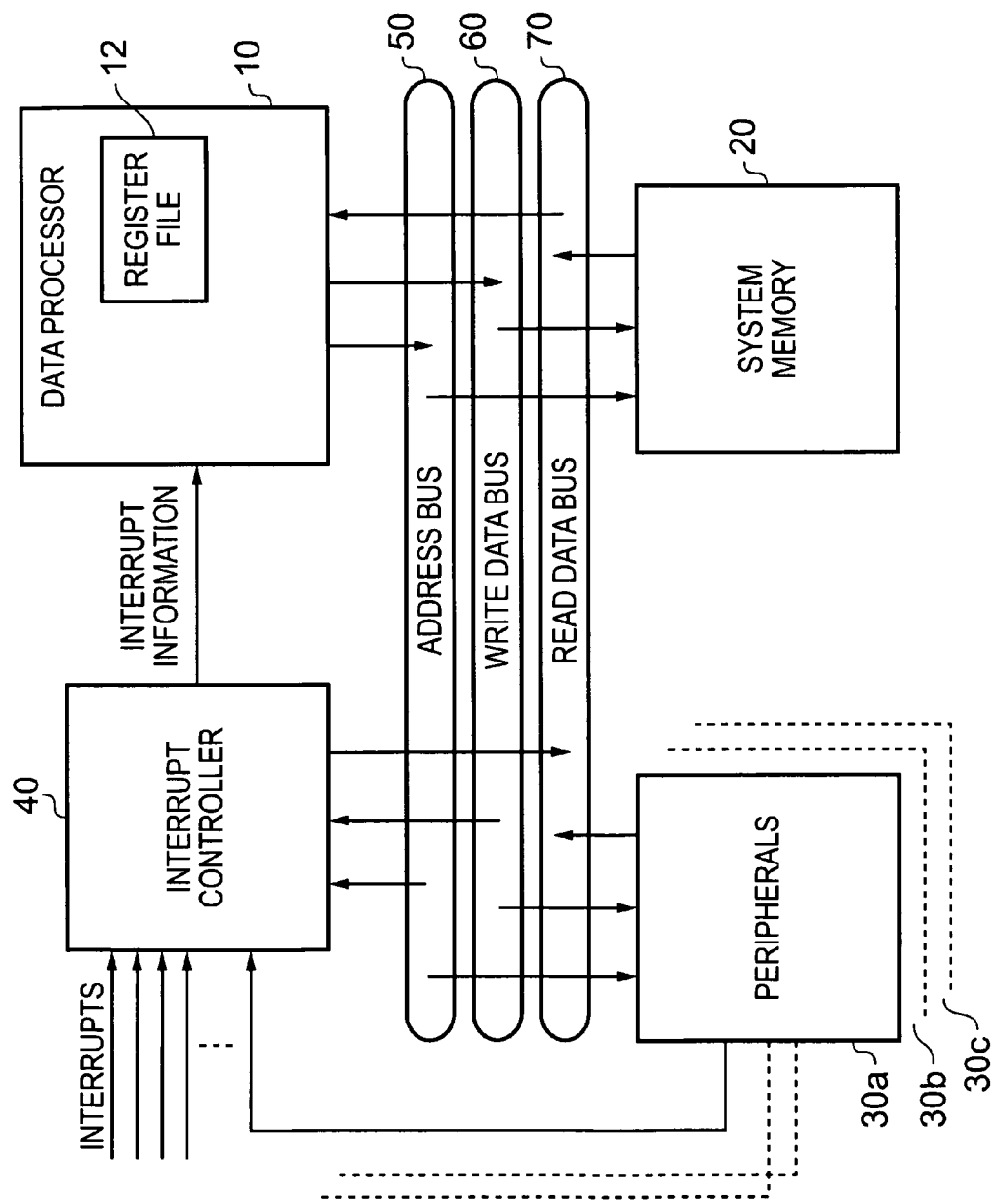

REGISTER FILE WITH CIRCUITRY FOR SETTING REGISTER ENTRIES TO A PREDETERMINED VALUE

BACKGROUND OF THE INVENTION

1. Field of the Invention

This invention relates to a register file, a data processing apparatus having a register file, and a method of updating a register file. More particularly, this invention relates to a register file, data processing apparatus and method in which a plurality of register entries are provided for storing data values for use in the execution of data processing instructions.

2. Description of the Prior Art

A register file is a set of registers typically provided in, or in association with, a processor such as a central processing unit (CPU). The register file temporarily stores data while it is being operated on by the processor. For example, data may be transferred from a memory to the register file when it is required to be operated on as part of a data processing operation, and data generated by a data processing operation may be stored to a register file before either being transferred to the memory or used by a subsequent data processing operation.

A register file has at least one write port, via which data is written into one or more registers of the register file, and at least one read port, via which data are read from one or more registers of the register file. A read port may comprise circuitry responsive to a read request received at the read port to output a data value contained in one or more registers identified by an address specified by the read request. A write port may comprise circuitry responsive to a write request received at the write port to update one or more registers identified by an address specified by the write request with a data value specified by the write request. In this way, data can be written to and read from the register file.

One way of increasing the performance of a processor is to allow folding, or dual-issue of certain operations, thereby reducing the effective number of cycles per instruction (CPI) of the processor. Supporting dual-issue requires the extension of the register file to provide additional read ports (to support the increased number of input operands required per cycle) and additional write ports (to allow commitment of the multiple computed results). Adding read and/or write ports to a processor design is expensive in terms of gate-count, and is thus undesirable in low-area designs. Folding is the ability to execute instructions that do not require register file access in parallel with other instructions, for example NOPs (no-operation instructions), branch instructions and in the case IF-THEN-ELSE instructions, where no source operands are required and only flags are updated. Folding therefore allows improved performance without the provision of additional read and/or write ports, but only where one of the instructions to be executed in parallel does not require access to the register file.

In US-A-2004/0225838, a register cache is provided in order to assist in alleviating demands on access ports associated with the register file.

SUMMARY OF THE INVENTION

Viewed from one aspect the present invention provides a register file comprising a plurality of register entries for storing data values for use in the execution of data processing instructions, said register file comprising:

2 at least one write port and at least one read port;

circuitry responsive to a write request received at said at least one write port to update one of said plurality of register entries identified by an address specified by said write request with a data value specified by said write request; and further circuitry responsive to a received control signal to set at least a portion of a predetermined register entry to a predetermined value.

In this way, certain register file updating instructions can be executed in parallel with other instructions without the need for additional full write-ports as would be required for typical dual-issue, thereby reducing area and routing complexity and cost compared with the use of an additional write-port due to the lower gate count required by the proposed further circuitry. This technique effectively extends the principle of folding to include instructions which require certain types of register file access, and in particular to instructions which require at least a portion of one or more predetermined register entries to be set to a predetermined value.

Advantages of this technique may include faster execution of certain functions, a potential magnitude of difference between the percentage increase in gate count and the percentage improvement in performance, and improved flexibility and performance compared with traditional instruction folding. Additionally, because the same code can be executed in less time due to parallel execution, the total energy requirement per line of code may be reduced.

The further circuitry may comprise control circuitry which is associated with a particular register entry and which receives the control signal, the control signal being dedicated to the control circuitry. In this way, separate control signals can be used to control the setting of data values in different register entries of the register file. Alternatively, the further circuitry may comprise control circuitry which is associated with a subset of the register entries and which receives the control signal, the control signal being dedicated to the control circuitry. In this case, a single control signal may be conveniently be used to control the setting of data values in several register entries of the register file.

The predetermined register entry may be set to a predetermined value in response to the control signal in parallel with one of the plurality of register entries identified by the address being updated with the data value in response to the write request or in parallel with one of the plurality of register entries being read in response to a read request. As a result, a form of parallel processing can be performed, thereby providing more rapid and efficient code execution.

An embodiment of the present invention provides a data processing apparatus, comprising a register file as described above, and decoding logic for decoding a set of data processing instructions for execution, the decoding logic being responsive to an instruction from a first subset of the set of data processing instructions to generate the write request and being responsive to an instruction from a second subset of the set of data processing instructions to generate the control signal; wherein the first subset is different to the second subset. It will be appreciated that the first subset of instructions may include those which require a form of write access to the register file which cannot readily be performed simply by setting a register entry to a predetermined value. As a result, these instructions cannot form part of the second subset. In one example, instructions of the second subset of data processing instructions do not require an access to the at least one read port.

Embodiments of the present invention can be utilized to enable various different types of instructions to be processed in parallel. For example, at least one of the instructions of the second subset of data processing instructions may comprise an instruction for setting a predetermined one of the register entries to a zero value, the control signal causing the predetermined register to be set to the zero value. Such instructions are widely used, for example for resetting variables stored in the register file.

In another example, at least one of the instructions of the second subset of data processing instructions may comprise an instruction for setting a return value for a function to a predetermined value, the control signal causing the predetermined register to be set to the return value.

As an example, a typical C function of the form:

```
int func(...)
{
a
b
return 0;
}
``` could be thus accelerated, because the instruction to set a return value to zero (return 0), which is achieved by setting a particular register entry to a zero value (for instance using a MOVS r0,#0 instruction in the ARM Thumb-2 instruction set), can be conducted in parallel with one or both of instructions "a" and "b".

This principle could also be used in respect of other common C return values, such as one (1) or minus one (−1).

In yet another example, at least one of the second subset of data processing instructions may comprise an instruction for initialising a loop counter in a predetermined register, the control signal causing said predetermined register to be set to an initialised value.

For instance, a loop counter function of the form "for(i=0; i<x)" can be accelerated, because the initialisation of the counter value i (in this case to a value of zero) can be conducted in parallel with an instruction forming part of the loop by providing that the counter value i is held in a register which can be set using the further circuitry.

In still another example, at least one of said second subset of data processing instructions may comprise an instruction for reducing a range of a value of integer type to a range of a different integer type, said control signal causing a predetermined number of most significant bits of said predetermined register entry to be set to a zero value.

In yet another example, at least one of said second subset of data processing instructions comprises an instruction for performing sign extension on a value stored in a predetermined register, said control signal causing a predetermined number of most significant bits of said predetermined register entry to be set to a predetermined value.

A good example of the desire for partial register zero/sign-extension results from the ISO/IEC 9899:1999 normative (the 'C' standard) and its typical implementation on processors containing 32-bit registers. Each of these registers could hold (amongst other types) a 32-bit implementation of a C 'int' variable, or a 32-bit sign-extended implementation of an 8-bit C 'char' variable. The standard requires that variables of type 'char' should be promoted to type 'int' before any arithmetic operation. In the case of an ARM processor this is free because the representation is already identical to an 'int' having the same value as the 'char'. However, it requires that the range of any assigned 'char' variable be reduced to that of a 'char', which requires an extraction to be performed.

For example:

```
char increment_by_one(char a)
{
    return a + 1;
}
``` might compile to:

```
ADD r0,r0,#1    ; increment entire 32-bit register by 1
SXTB r0,r0      ; signed-extract byte (set bits[31:8] equal to bit[7])
BX lr           ; return to caller
```

Likewise, for 'unsigned char' bits [31:8] would be flushed to zero using a UXTB instruction. This is useful in the case of ARM instructions, because no ARM instruction exists which performs a single 8-bit addition.

Embodiments of the present invention would allow folding of the SXTB/UXTB instruction.

The data processing apparatus may be configured to issue the generated write request and the generated control signal to the register file at substantially a same time, such that they are executed in parallel.

The data processing apparatus may be configured such that the set of data processing instructions comprise a third subset, the third subset comprising instructions comprising a read request, the decoding logic being responsive to an instruction from the third subset of instructions to generate the read request, wherein the data processing apparatus is configured to issue the generated read request and the generated control signal to the register file at substantially a same time, such that they are executed in parallel.

One embodiment of the invention can be realised in the form of an adaptation of the ARM Cortex-M3 architecture, which handles Thumb-2 instructions, has two read ports, one write port and provides instruction folding for instructions which do not require a register file access. In particular, the ARM Cortex-M3 architecture can be adapted by adding an extension to the folding logic to detect certain instructions (such as MOVS r0,#0) and to generate in response a new signal into the instruction execution logic indicating that the instruction has been folded. As will be appreciated this will result in some increase in the gate count of the register file. In particular, in one implementation thirty two AND gates will be added at the inputs of the R0 register file D-type flip flops, an OR gate onto the R0 register file D-type enables, an AND gate onto the Negative-flag input and an OR gate onto the Zero-Flag input—all connected to the new control signal. The total cost of this configuration, in terms of gate count, on top of the pre-existing folding, is approximately 60 gates. This is substantially less than the number of gates required for a full additional write port, which will be approximately 1500 gates (16 registers each requiring 32 gates).

Viewed from another aspect the present invention provides a method of updating a register file comprising a plurality of register entries for storing data values for use in the execution of data processing instructions, comprising the steps of:

receiving a write request at a write port of said register file;

updating one of said plurality of register entries identified by an address specified by said write request with a data value specified by said write request in response to said write request;

receiving a control signal at said register file; and setting at least a portion of a predetermined register entry to a predetermined value in response to said control signal.

Viewed from yet another aspect the present invention provides a register file comprising a plurality of register entries for storing data values for use in the execution of data processing instructions, said register file comprising:

input means and output means;

updating means for updating, in response to a write request received at said input means, one of said plurality of register entries identified by an address specified by said write request with a data value specified by said write request; and setting means for setting, in response to a received control signal, at least a portion of a predetermined register entry to a predetermined value.

The above, and other objects, features and advantages of this invention will be apparent from the following detailed description of illustrative embodiments which is to be read in connection with the accompanying drawings.

BRIEF DESCRIPTION OF TIM DRAWINGS

Figure 2:
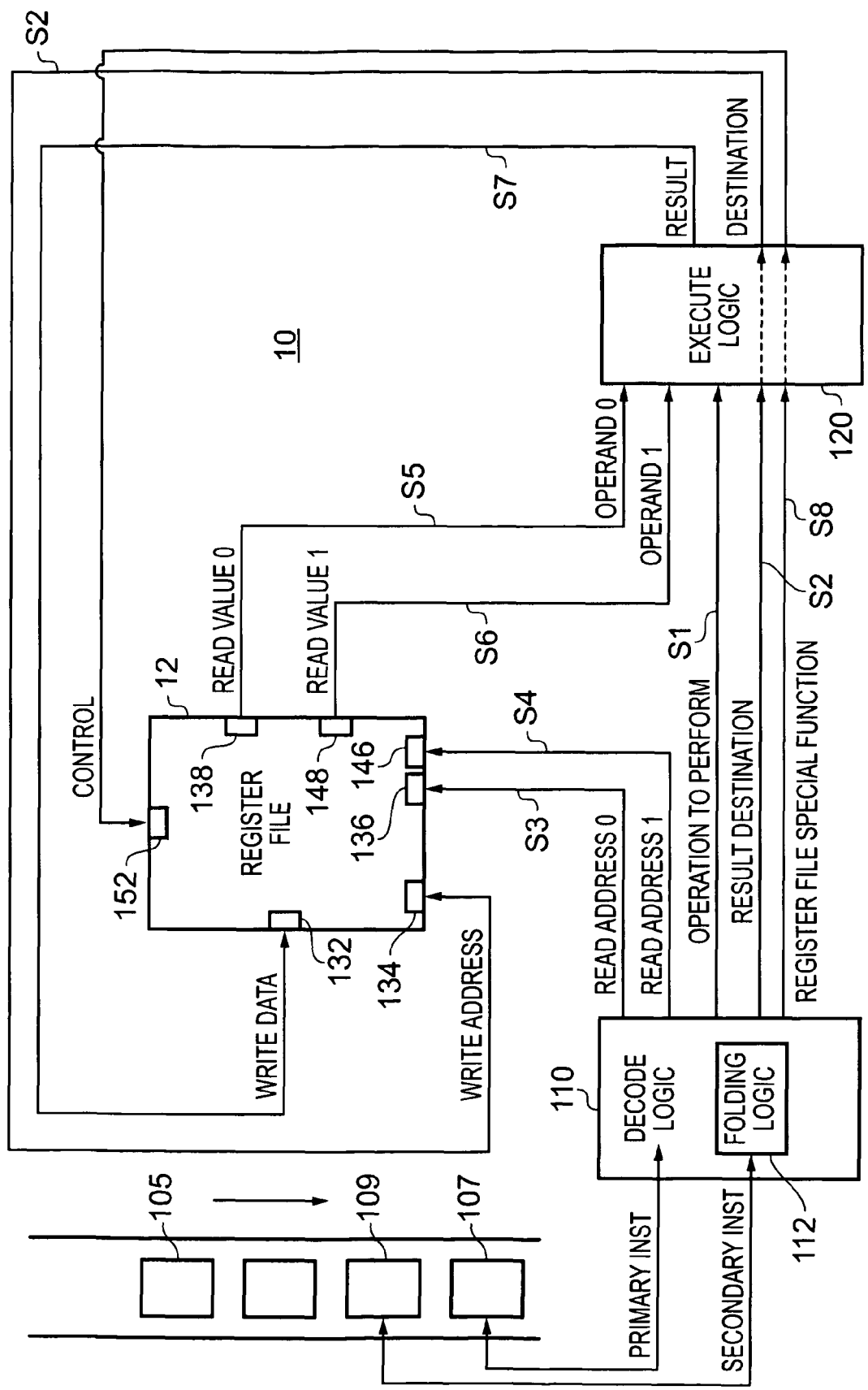
Figure 3A:
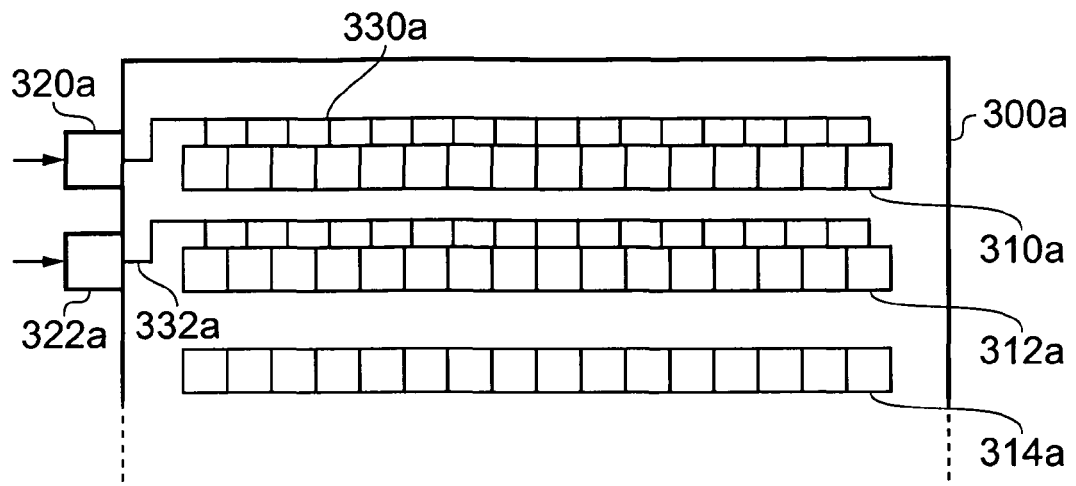
Figure 3B:
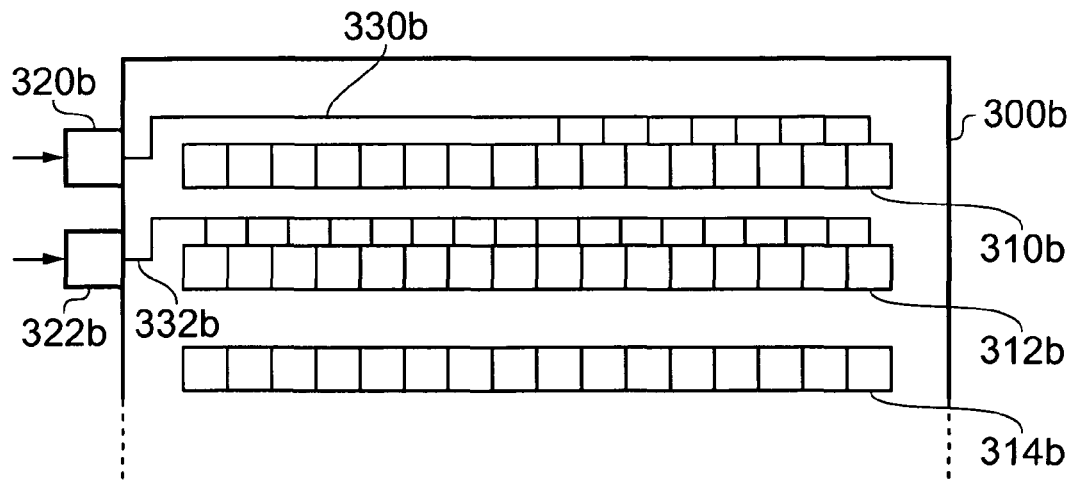
Figure 3C:
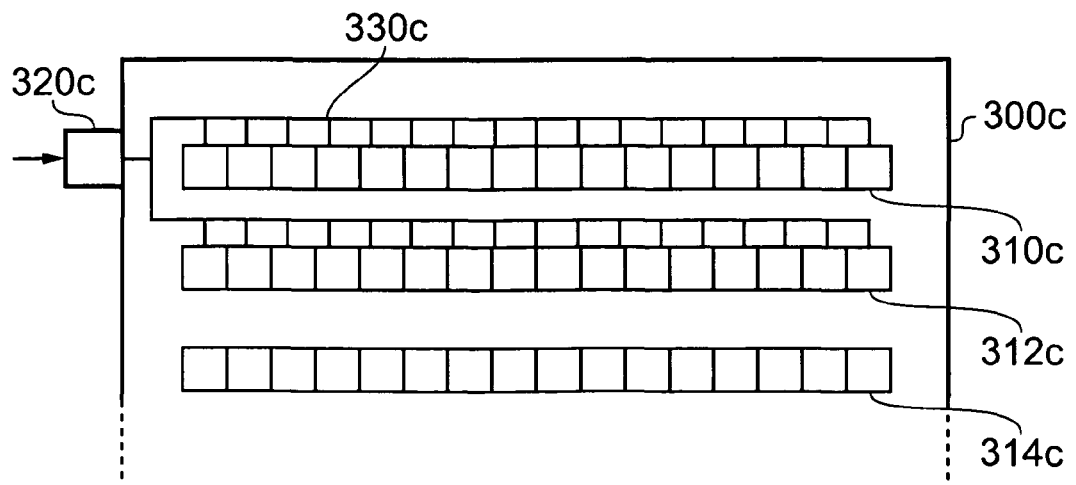
Figure 4:
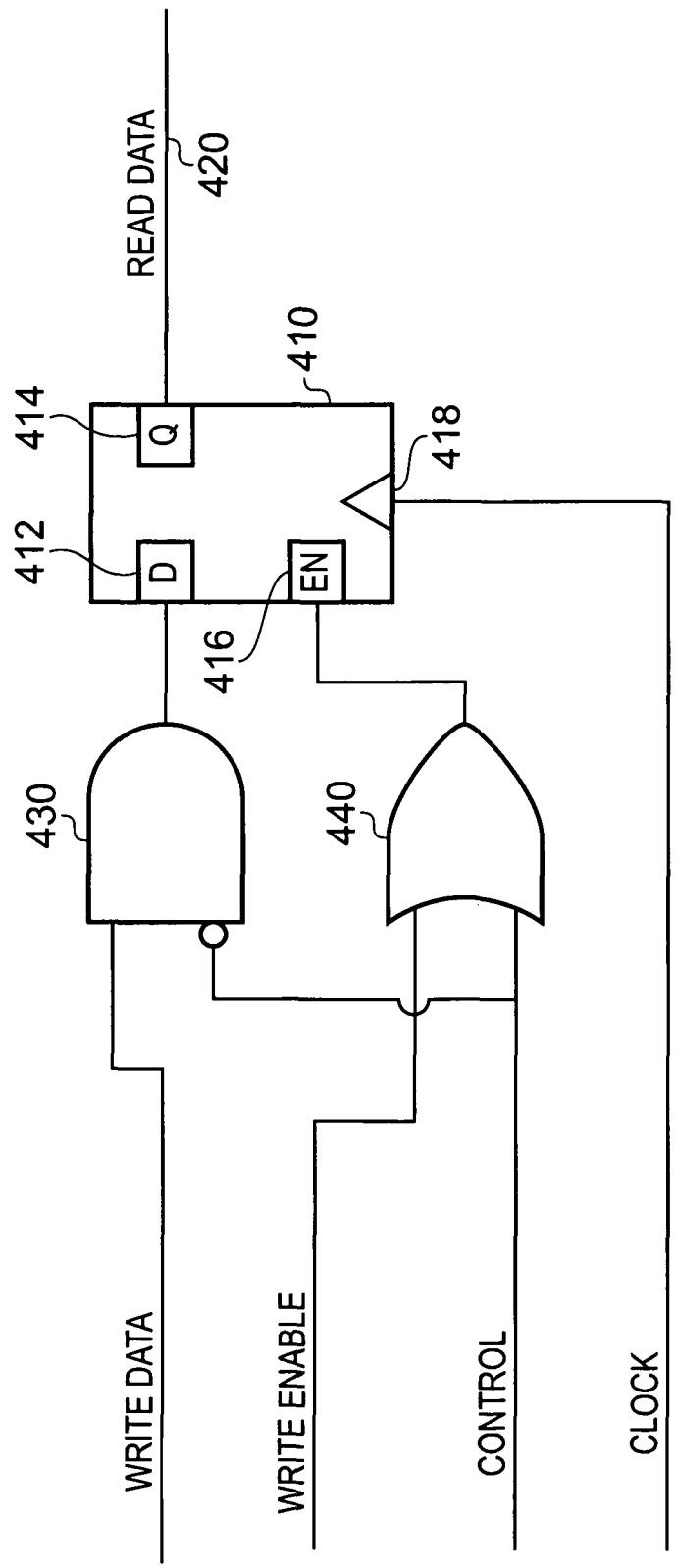
Figure 5:
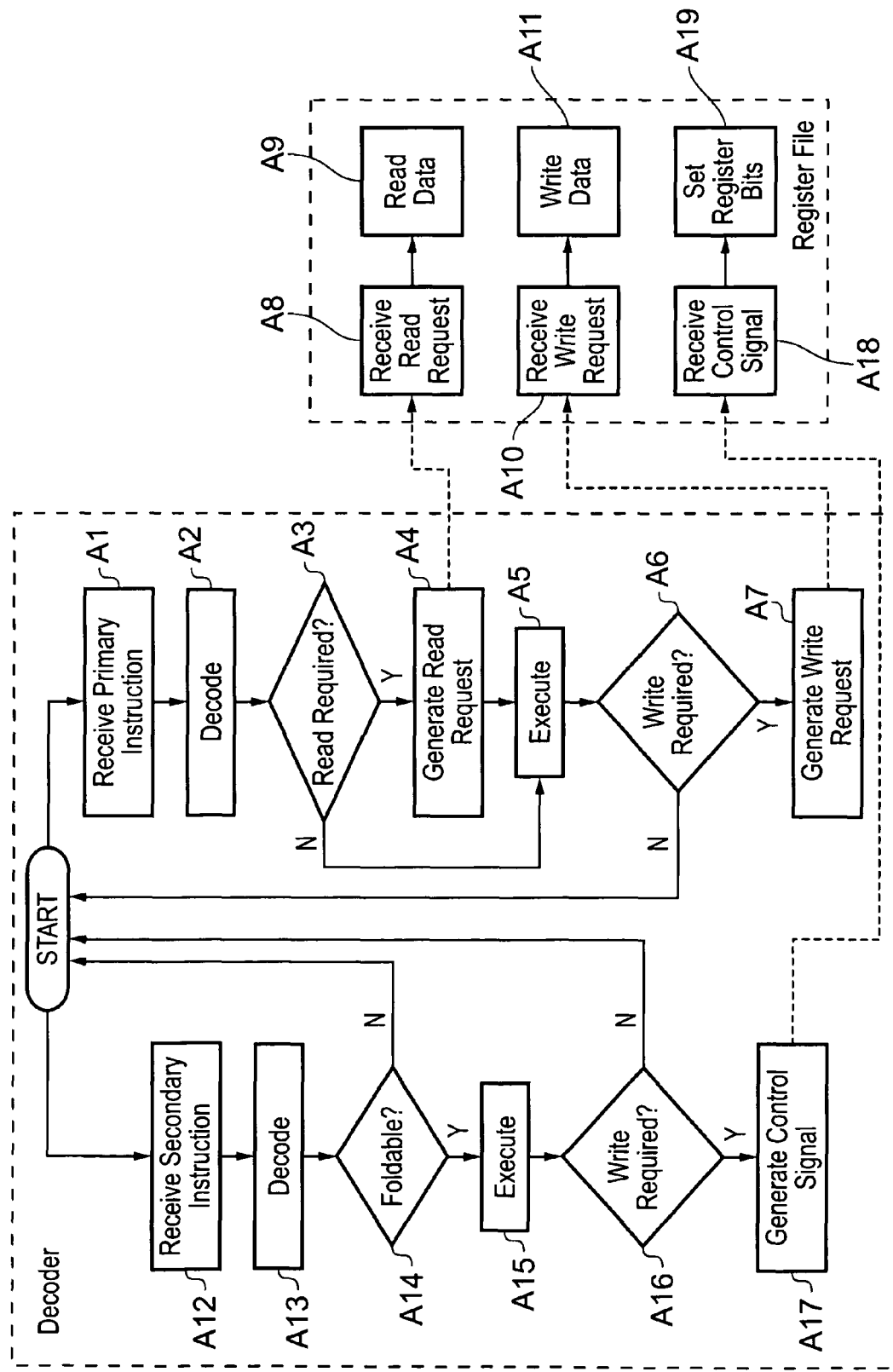

FIG. 1 schematically illustrates a data processing system comprising a data processor, an interrupt controller, a system memory and a plurality of peripherals;

FIG. 2 schematically illustrates a data processor having a register file according to an embodiment of the present invention;

FIGS. 3A to 3C schematically illustrate a portion of a register file having further circuitry for setting portions of register entries to predetermined values;

FIG. 4 schematically illustrates a logic circuit arrangement of a single bit of a register in a register file according to an embodiment of the present invention; and FIG. 5 is a schematic flow diagram illustrating a decoder operation and register file operation according to an embodiment of the present invention.

DESCRIPTION OF THE PREFERRED EMBODIMENTS

A data processing apparatus 1 is schematically illustrated in FIG. 1. The data processing apparatus 1 comprises a data processor 10 for executing data processing instructions, a system memory 20 for storing data, a plurality of peripherals 30a, 30b, 30c which are hardware devices forming part of the data processing apparatus 1. The data processing apparatus also comprises an interrupt controller 40, which is responsive to interrupt requests received from, for example, the peripherals 30a, 30b, 30c to issue interrupt information to the data processor 10. The interrupt information causes the data processor 10 to interrupt a current operation to perform an operation indicated by the interrupt information. The interrupt controller 40 may also be responsive to interrupt requests generated by devices external to the data processing apparatus, and to software interrupts generated by the data processor 10 in response to particular data processing instructions.

The data processor 10 comprises a register file 12 which includes a plurality of registers for temporarily storing data while it is being operated on by the data processor 10. The register file serves as a bridge between the data processor 10 and the system memory 20. In this way, data from the system memory 20 may be transferred to the register file 12 when it is required to be operated on as part of a data processing operation, and data generated by a data processing operation may be stored to the register file 12 before either being transferred to the system memory 20 or used by a subsequent data processing operation.

The data processor 10, the peripherals 30a, 30b, 30c and the interrupt controller 40 are coupled to each other, and to the system memory 20, by an address bus 50, a write data bus 60 and a read data bus 70. Data can be written into the system memory 20 using the address bus 50 (to identify a memory address of the system memory 20 at which the data is to be stored) and the write data bus 60, which carries the data to be written into the system memory 20. Data can be read from the system memory 20 using the address bus 50 (to identify a memory address of the system memory 20 from which the data is to be read) and the read data bus 70, which carries the data read from the system memory 20.

The data processor 10 of FIG. 1 is schematically illustrated in more detail in FIG. 2. The data processor 10 is shown to include, in addition to the register file 12, decode logic 110 and execute logic 120. The decode logic 110 decodes incoming data processing instructions from an instruction pipeline 105 and generates, in response to the incoming data processing instructions, an operation to perform and register addresses for accessing the register file 12. Signals s1 and s2 indicative respectively of the operation to perform and of a destination address for writing a result of the operation into the register file 12 are communicated from the decode logic 110 to the execute logic 120.

Signals s3 and s4 indicative respectively of first and second read addresses for reading operand data for use in the operation from the register file 12 are communicated from the decode logic 110 to the register file 12.

The register file 12 comprises a first read port comprising read address input circuitry 136 for receiving the read address signal s3 and read value output circuitry 138 for outputting a data value held in a register entry indicated by the read address signal s3 received at the read address input circuitry 136. The register file 12 also comprises a second read port comprising read address input circuitry 146 for receiving the read address signal s4 and read value output circuitry 148 for outputting a data value held in a register entry indicated by the read address signal s4 received at the read address input circuitry 146. The data values output from the read value output circuitry 138 and the read value output circuitry 148 are communicated from the register file 12 to the execute logic 120 as operand values in association with the signals indicative of the operation to perform and the result destination. These signals in combination allow the execute logic 120 to perform the operation indicated by the signal s1 on the operand data provided by the signals s5 and s6 to generate a result data value.

The result data value is then communicated to the register file 12 as a signal s7 in association with the signal s2 indicating the destination address to which the result data value should be stored. The register file 12 comprises write address input circuitry 134 for receiving the signal s2, and write value input circuitry 132 for receiving the signal s7. The write address input circuitry 134 and the write value input circuitry 132 together form a write port, which is configured to store the result data value carried by the signal s7 into a register entry indicated by the signal s2.

The decode logic 110 also provides folding logic 112 which permits, under certain circumstances, a second instruction to be executed concurrently with an instruction executed conventionally by the decode logic 110. In order to achieve this, the folding logic 112 examines a secondary data processing instruction 109 occurring after the primary data processing instruction 107 in the instruction pipeline 105 while the decode logic 110 is processing the primary data processing instruction 107, and determines whether the secondary data processing instruction 109 can be executed concurrently with the primary data processing instruction 107. If such concurrent execution is determined to be possible, the folding logic 112 generates a register file special function and communicates it to the register file 12 via the execute logic 120 as a control signal s8. The register file 12 comprises further circuitry 152 for receiving the control signal s8 and setting at least a portion of at least one predetermined register entry to a predetermined value in response to the signal s8. In this way, a secondary instruction which requires all or part of one or more register entries to be set to a predetermined value can be executed concurrently with a primary data processing instruction which requires a register file access.

It will be appreciated that the folding logic 112 need not necessarily be restricted to handling a secondary data processing instruction which immediately follows the primary data processing instruction, but might also handle data processing instructions at other positions following the primary data processing instruction within the instruction pipeline 105. Alternatively, a secondary data processing instruction handled by the folding logic 112 might be positioned in advance of the primary data processing instruction within the instruction pipeline 105.

Instructions received at the decode logic 110 may be considered to belong to a first subset of instructions which require full write access to the register file 12, and therefore trigger the decode logic 110 to generate a read request, a second subset of instructions which require read access to the register file 12, and therefore trigger the decode logic 110 to generate a write request, or a third subset of instructions which can be executed by generating the control signal to set one or more register entries to a predetermined value. A fourth subset could also be considered which do not require any access to the register file at all. Instructions of the third subset or the fourth subset can be handled by the folding logic concurrently with instructions of the first subset or the second subset. In the case of the third subset this is because the instructions can be affected by using the control signal to set predetermined register entries to a predetermined value without using the read or write ports of the register file 12, which are at that time being used by an instruction of the first or second subset. In the case of the fourth subset this is because no access to the register file 12 is required at all. It will also be appreciated that an instruction of the fourth subset could be handled by the folding logic 112 concurrently with an instruction of the fourth subset, or concurrently with another instruction of the third subset which sets different register entries to a predetermined value.

Example register files are schematically illustrated in FIGS. 3A to 3C, in which only the register entries and further control circuitry are shown for the sake of clarity. It will be appreciated that the register file would also include one or more read and write ports which would be connected to the register entries. In FIG. 3A, a portion of a register file 300a is shown, and comprises a plurality of register entries 310a, 312a and 314a, each of which comprises 16 bits. The register entries have been illustrated here with 16 bits for the sake of clarity, and it will be appreciated that the register entries may comprise a different number of bits, for instance 32. While FIG. 3A only shows three register entries for clarity, a register file would usually include more than this, commonly 16 registers.

In FIG. 3A, the register file 300a comprises first control circuitry 320a which is dedicated to the first register entry 310a, and second control circuitry 322a which is dedicated to the second register entry 312a. In this example the third register entry 314a is not connected to control circuitry, and may be accessed only using standard read and write ports. It should be understood that the first register entry 310a and the second register entry 312a can be accessed using standard read and write ports in addition to being controlled by the control circuitry. The first control circuitry 320a is connected to each bit of the first register entry 310a via a connection 330a, and is responsive to a received control signal to set all the bits of the first register entry 310a to a predetermined value. The second control circuitry 322a is connected to each bit of the second register entry 312a via a connection 332a, and is responsive to a received control signal to set all the bits of the second register entry 312a to a predetermined value. In this way, separate control signals can be used to separately set the first register entry 310a and the second register entry 312a to respective predetermined values. For instance, each bit of the first register entry 310a might be set to a zero value while each bit of the second register entry 312a might be separately set to a value of one.

Referring now to FIG. 3B, a register file 300b comprises first control circuitry 320b which is dedicated to the first register entry 310b, and second control circuitry 322b which is dedicated to the second register entry 312b. As with FIG. 3A, the third register entry 314b is not connected to control circuitry, and is accessed only using standard read and write ports. The first control circuitry 320b is connected to only the eight least significant bits of the first register entry 310b via a connection 330b, and is responsive to a received control signal to set the eight least significant bits of the first register entry 310b to a predetermined value. The second control circuitry 322b is connected to each bit of the second register entry 312b via a connection 332b in the same way as the second control circuitry 322a of FIG. 3A, and is responsive to a received control signal to set all the bits of the second register entry 312b to a predetermined value. In this way, separate control signals can be used to separately set a subset of the first register entry 310b to a predetermined value and all of the bits of the second register entry 312b to a predetermined value. The first register entry 310b could therefore be used to reduce a range of a value of integer type to a range of a different integer type or to perform sign extension on a value stored in the register.

Referring now to FIG. 3C, a register file 300c comprises first control circuitry 320c which is dedicated to both the first register entry 310c and the second register entry 312c. As with FIGS. 3A and 3B, the third register entry 314c is not connected to control circuitry, and is accessed only using standard read and write ports. The first control circuitry 320c is connected to each bit of both the first register entry 310c and the second register entry 312c via a connection 330c, and is responsive to a received control signal to set all the bits of both the first register entry 310c and the second register entry 312c to a predetermined value. In this way, a single control signal can be used to simultaneously set both the first register entry 310c and the second register entry 312c to a predetermined value.

FIG. 4 schematically illustrates circuitry suitable for setting a single bit of a register entry to a zero value. It will be appreciated that the circuitry shown in FIG. 4 can be replicated for each bit of one or more register entries which are required to be set to a zero value in response to a control signal from the folding logic. It will also be appreciated that the circuitry shown in FIG. 4 could be adapted to set the single bit of the register entry to a value of one. The register bit illustrated in FIG. 4 comprises a flip flop 410 which stores and retains a data value applied to the flip flop 410. The flip flop 410 comprises a write input 412 for receiving a data value to be stored in the flip flop 410, a read output 414 for providing a data value currently stored in the flip flop 410 on a read data line 420 for output. The flip flop 410 also comprises a write enable input 416 which is responsive to a write enable signal to permit the data value received at the write input 412 to be stored into the flip flop 410 in response to a transition of a clock signal received at a clock input 418. A data value asserted at the write input 412 is therefore stored into the flip flop 410 in response to a clock transition at the clock input 418 while a write enable signal is being asserted at the write enable input 416.

Conventionally, the setting of a data value in a flip flop requires a write data signal, a write enable signal, and a clock signal. The circuitry shown in FIG. 4 uses these signals, but additionally utilises a control signal which can directly set the value of the flip flop 410 to a desired value, in this case zero. The circuitry comprises an AND gate 430 having a non-inverting input which receives the write data signal, and an inverting input which receives, and inverts, the control signal. The output of the AND gate 430 will therefore correspond to the write data signal when the control signal is a zero value, and will always have a zero value when the control signal has a value of one. The output of the AND gate 430 is provided to the write input 412 of the flip flop 410.

The circuitry also comprises an OR gate 440 which receives the write enable signal at one input, and the control signal at the other input. The output of the OR gate 440 will therefore be high whenever either the write enable signal or the control signal are high. The output of the OR gate 440 is provided to the write enable input 416 of the flip flop 410. A data value asserted at the write input 412 will therefore be stored into the flip flop 410 (in response to a clock transition) when either the write enable signal or the control signal are high.

In this way, when the control signal is low, the flip flop 410 will be responsive to a write data signal, a write enable signal and a clock signal to store a data value in the usual way. However, when the control signal is high, the output of the AND gate 430 will be caused to take on a zero value, and the output of the OR gate 440 will be high to permit the zero value asserted by the AND gate 430 onto the flip flop 410 to be stored. This provides a low gate count method of permitting a flip flop forming part of a register entry to be set to a predetermined (in this case zero) value.

Referring now to FIG. 5, an example method of operation of the data processor of FIG. 2 is schematically illustrated by way of a flow diagram. In FIG. 5, steps A1 to A7 and A12 to A17 can be considered to be processes of the decoder, and in particular of the decode logic 110 and execute logic 120 illustrated in FIG. 2. Steps A8 to A11, A18 and A19 can be considered to be processes of the register file 12 illustrated in FIG. 2.

At a step A1, the decoder receives a primary instruction from an incoming instruction stream. At a step A2 the decoder decodes the primary instruction to identify a data processing operation which is to be performed, and read and/or write addresses for accessing the register file. Then, at a step A3, the decoder determines whether the decoded primary instruction requires the register file to be read from, and if so, generates a read request at a step A4 for transmission to the register file. The process then moves on to a step A5, where an operation dictated by the primary instruction is executed. If at the step A3 the decoder determines that the decoded primary instruction does not require the register file to be read from, the process moves directly on to the step A5 for the instruction to be executed. At a step A6, the decoder determines whether the decoded primary instruction requires the register file to be written to. If at the step A6 the decoder determines that the decoded primary instruction requires the register file to be written to, the process moves on to a step A7, where a write request is generated for transmission to the register file. If, at the step A6, no write access to the register file is required, the process ends and a subsequent instruction can be processed.

In the register file, at a step A8, the register file receives a read request from the decoder generated at the step A4. The read request indicates an address within the register file from which data values are to be read out and provided to the decoder. At a step A9, the register file reads out the required data values from a register entry designated by the address and provides them to the decoder to enable execution of the primary instruction at the step A5. At a step A10, the register file receives a write request from the decoder generated at the step A7. The write request indicates a data value to be stored into the register file, and an address within the register file at which the data value is to be written. In this way, the instruction can be executed at the step A5 using operands requested from the register file at the step A4, and the result of the operation can be stored into the register file at the step A11.

At a step A12, a secondary instruction is received at the decoder. The secondary instruction can be handled concurrently with the primary instruction. In other words, steps A12 to A19 can be handled concurrently with the steps A1 to A11. At a step A13 the decoder decodes the secondary instruction to identify the nature of the data processing operation which is to be performed. At the step A14, the decoder determines whether the secondary instruction is foldable with the primary instruction. In other words, it is determined whether the secondary instruction is of a type which can be executed without interfering with the execution of the primary instruction. In particular, the secondary instruction may be foldable if either it does not require a register file access, or if it requires the whole or part of a particular register entry to be set to a predetermined value.

If it is determined at the step A14 that the secondary instruction is not foldable, the process ends. If however it is determined at the step A14 that the secondary instruction is foldable, the secondary instruction is executed at a step A15. Then, at a step A16 it is determined whether simple write access to the register file is required to set all or part of one or more register entries to a predetermined value. If it is determined at the step A16 that such a write is required, a control signal is generated at a step A17, and is communicated to the register file. At a step A18, the register file receives the control signal generated by the decoder at the step A17, and sets, at a step A19, the required register bits to the predetermined value.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A register file comprising a plurality of register entries for storing data values for use in the execution of data processing instructions permitting parallel execution of primary and secondary data processing instructions which instructions require write access to the register file, said register file comprising:

at least one write port and at least one read port;

circuitry, responsive to a write request in response to the execution of said primary data processing instruction, configured to update one of said plurality of register entries identified by an address specified by said write request with a data value specified by said write request; and further circuitry, responsive to a control signal generated in response to the execution of the secondary data processing instruction, configured to set at least a portion of a predetermined one of said plurality of register entries to a predetermined value without using any write port and without using any read port, wherein said further circuitry is hardwired to generate said predetermined value.

2. A register file according to claim 1, wherein said further circuitry comprises control circuitry associated with said predetermined register entry, said control signal being dedicated to said control circuitry.

3. A register file according to claim 1, wherein said further circuitry comprises control circuitry associated with a subset of said register entries, said control signal being dedicated to said control circuitry.

4. A register file according to claim 1, wherein said predetermined register entry is set to a predetermined value in response to said control signal in parallel with said one of said plurality of register entries identified by said address being updated with said data value in response to said write request or in parallel with one of said plurality of register entries being read in response to a read request.

5. A data processing apparatus, comprising:
a register file according to claim 1; and
decoding logic for decoding a set of data processing instructions for execution, said decoding logic being responsive to an instruction from a first subset of said set of data processing instructions to generate said write request and being responsive to an instruction from a second subset of said set of data processing instructions to generate said control signal; wherein
said first subset is different to said second subset.

6. A data processing apparatus according to claim 5, wherein instructions of said second subset of data processing instructions do not require an access to said at least one read port.

7. A data processing apparatus according to claim 5, wherein said instruction of said second subset of data processing instructions comprises an instruction for setting a predetermined one of said register entries to a zero value, said control signal causing said predetermined register to be set to said zero value.

8. A data processing apparatus according to claim 5, wherein said instruction of said second subset of data processing instructions comprises an instruction for setting a return value for a function to a predetermined value, said control signal causing said predetermined register to be set to said return value.

9. A data processing apparatus according to claim 5, wherein at least one of said second subset of data processing instructions comprises an instruction for initialising a loop counter in a predetermined register, said control signal causing said predetermined register to be set to an initialised value.

10. A data processing apparatus accordingly to claim 5, wherein at least one of said second subset of data processing instructions comprises an instruction for reducing a range of a value of integer type to a range of a different integer type, said control signal causing a predetermined number of most significant bits of said predetermined register entry to be set to a zero value.

11. A data processing apparatus according to claim 5, wherein at least one of said second subset of data processing instructions comprises an instruction for performing sign extension on a value stored in a predetermined register, said control signal causing a predetermined number of most significant bits of said predetermined register entry to be set to a predetermined value.

12. A data processing apparatus according to claim 5, said data processing apparatus being configured to issue said generated write request and said generated control signal to said register file at substantially a same time, such that the register entry is updated in response to the write request in parallel with said at least a portion of the predetermined register entry set to the predetermined value in response to the control signal.

13. A data processing apparatus according to claim 5, wherein said set of data processing instructions comprise a third subset, said third subset comprising instructions comprising a read request, said decoding logic being responsive to an instruction from said third subset of instructions to generate said read request, wherein said data processing apparatus is configured to issue said generated read request and said generated control signal to said register file at substantially a same time, such that a register entry is read in response to the read request in parallel with said at least a portion of the predetermined register entry set to the predetermined value in response to the control signal.

14. A register file according to claim 1, wherein said further circuitry is only responsive to a single control signal.

15. A register file according to claim 1, wherein a subset of said plurality of register entries are set by said further circuitry.

16. A register file according to claim 1, wherein each of said at least one write port has a number of gates, and said further circuitry comprises fewer gates than each of said at least one write port.

17. A register file according to claim 1, wherein said further circuitry is configured to set said at least a portion of said predetermined one of said register entries to said predetermined value without specifying an address identifying said predetermined one of said register entries.

18. A register file according to claim 1, wherein said predetermined one of said register entries is predetermined based on hardwiring in said further circuitry.

19. A method of updating a register file comprising at least one write port, at least one read port, and a plurality of register entries for storing data values for use in the execution of data processing instructions permitting parallel execution of primary and secondary data processing instructions which instructions require write access to the register file, comprising the steps of:
receiving a write request at one of said at least one write port of said register file;
updating, in response to said write request and execution of said primary data processing instruction, one of said plurality of register entries identified by an address specified by said write request with a data value specified by said write request;
receiving a control signal generated in response to execution of the secondary data processing instruction at said register file; and
setting, in response to said control signal, at least a portion of a predetermined one of said plurality of register entries to a predetermined value without using any write port and without using any read port, said steps are implemented on a data processor, wherein said setting is performed using further circuitry hardwired to generate said predetermined value.

20. A method of updating a register file according to claim 19, comprising the steps of:

generating said write request comprising said data value and said address in response to an instruction from a first subset of a set of data processing instructions;

generating said control signal in response to an instruction from a second subset of said set of data processing instructions; wherein said first subset is different to said second subset.

21. A method of updating a register file according to claim 20, comprising the step of:

issuing said generated write request and said generated control signal to said register file at substantially a same time, such that the register entry is updated in response to the write request in parallel with said at least a portion of the predetermined register entry set to the predetermined value in response to the control signal.

22. A method of updating a register file according to claim 20, wherein said set of data processing instructions comprise a third subset, said third subset comprising instructions comprising a read request, said method comprising the steps of:

generating said read request in response to an instruction from said third subset of instructions; and issuing said generated read request and said generated control signal to said register file at substantially a same time, such that a register entry is read in response to the read request in parallel with said at least a portion of the predetermined register entry set to the predetermined value in response to the control signal.

23. A register file comprising a plurality of register entries for storing data values for use in the execution of data processing instructions permitting parallel execution of primary and secondary data processing instructions which instructions require write access to the register file, said register file comprising:

at least one write port configured to provide an input to said register file and at least one read port configured to provide an output from said register file;

updating means for updating, in response to a write request and execution of said primary data processing instruction, one of said plurality of register entries identified by an address specified by said write request with a data value specified by said write request; and setting means for setting, in response to a control signal, at least a portion of a predetermined one of a plurality of register entries to a predetermined value without using any write port and without using any read port, wherein said setting means is hardwired to generate said predetermined value.

24. A data processing apparatus, comprising:

a register file according to claim 23; and decoding means for decoding a set of data processing instructions for execution, said decoding means being responsive to an instruction from a first subset of said set of data processing instructions to generate said write request and being responsive to an instruction from a second subset of said set of data processing instructions to generate said control signal; wherein said first subset is different to said second subset.

25. A data processing apparatus according to claim 24, said data processing apparatus being configured to issue said generated write request and said generated control signal to said register file at substantially a same time, such that the register entry is updated in response to the write request in parallel with said at least a portion of the predetermined register entry set to the predetermined value in response to the control signal.

26. A data processing apparatus according to claim 24, wherein said set of data processing instructions comprise a third subset, said third subset comprising instructions comprising a read request, said decoding means being responsive to an instruction from said third subset of instructions to generate said read request, wherein said data processing apparatus is configured to issue said generated read request and said generated control signal to said register file at substantially a same time, such that a register entry is read in response to the read request in parallel with said at least a portion of the predetermined register entry set to the predetermined value in response to the control signal.

* * * * *